United States Patent [19]
Haines

[11] Patent Number: 5,379,787
[45] Date of Patent: Jan. 10, 1995

[54] POP-UP ASHTRAY

[75] Inventor: Richard K. Haines, Elkhart, Ind.

[73] Assignee: Elkhart Door, Inc., Elkhart, Ind.

[21] Appl. No.: 137,850

[22] Filed: Oct. 15, 1993

[51] Int. Cl.6 .................. A24F 19/02; A24F 19/08
[52] U.S. Cl. .................................. 131/242; 131/231; 296/37.9
[58] Field of Search .......... 131/231, 242; 296/37.9; 224/278, 280–282

[56] References Cited

U.S. PATENT DOCUMENTS

| | | | |
|---|---|---|---|
| 2,203,960 | 6/1940 | Hickman | 131/242 |
| 3,166,080 | 1/1965 | Neale | 131/242 |
| 4,676,544 | 6/1987 | Dabringhaus et al. | 296/37.9 |
| 4,838,599 | 6/1989 | Bruhnke et al. | 296/37.9 |
| 4,925,072 | 5/1990 | Master et al. | 296/37.9 X |
| 5,144,963 | 9/1992 | Dabringhaus et al. | 131/242 X |

FOREIGN PATENT DOCUMENTS 2206217 8/1973 Germany ................. 131/231

Primary Examiner—Jennifer Bahr
Attorney, Agent, or Firm—Trexler, Bushnell, Giangiogi & Blackstone, Ltd.

[57] ABSTRACT

A pop-up ashtray includes a generally rectilinear receiver member, a generally rectilinear ash-pot member defining an open-topped container and adapted for removable mounting recessed within the receiver member, a lid member adapted for overlying the open-topped container defined by the ash-pot member, a cooperative interfitting hinge formed on the receiver member and on the lid member for hingedly mounting the lid member to the receiver member, a spring for urging the ash-pot member in a direction for removal thereof from the receiver member, and a releasable clasp for overcoming the urging force of the spring and releasably holding the ash-pot member recessed within the receiver member.

7 Claims, 3 Drawing Sheets

POP-UP ASHTRAY

BACKGROUND OF THE INVENTION

This application is directed generally to accessories for motor vehicles, such a recreational vehicles and the like, and more particularly to a novel and improved pop-up ashtray for use in a motor vehicle or the like.

Ashtrays for motor vehicles must generally be removable in order to permit periodic emptying and cleaning thereof. Generally speaking, most ashtrays in motor vehicles are configured for insertion into a through opening in a generally horizontal panel of the vehicle, such as in an armrest, a console or other relatively flat, generally horizontal surface.

Most commonly, a simple cutout or opening is provided in the horizontal surface and ashtray is configured for a sliding frictional fit in the through opening. Often, the ashtray will have an enlarged peripheral flange at an upper portion thereof to define a fully inserted or seated position of the ashtray with respect to its through opening. Usually, removal is accomplished by grasping of the flange or some other manually accessible portion of the ashtray and pulling upwardly to slidably remove the ashtray from its receiving aperture. Often times, such ashtrays are provided with a hingedly attached lid which provides a closure over an otherwise open top portion of the ashtray. In this regard, the ashtray usually defines an open-topped receptacle or container of selected depth, generally defined by a peripheral side wall and a bottom wall. The side walls and bottom wall may be integrally formed as by a cold forming operation on a sheet of material. Frequently, the peripheral upper flange portion which generally surrounds the open top of the container is also formed in the same process.

However, grasping of the peripheral flange for removal of the ashtray is often difficult, because the peripheral flange is usually pressed flush against the panel about the aperture into which the ashtray is mounted. Thus, working of a fingernail or other object between the flange and the panel is necessary to remove the ashtray from the panel in this fashion. This can result in broken fingernails, or where a tool or other object is used, in scratching, marring and/or other damage to the flange of the ashtray as well as to portions of the panels surrounding the aperture into which the ashtray fits.

Often, removal is accomplished by grasping the lid or some other projecting portion of the ashtray. While sometimes a graspable projecting portion is provided for this purpose, sometimes this is not the case. Thus, it is frequently necessary to grasp the hingedly attached lid portion, or some other projecting portion, such as the cigarette or cigar stub-out portion which often projects interiorly of the container defined within the walls of the ashtray. However, these portions of the ashtray may often be soiled from use, causing soiling of the fingers of the user during the process of removal of the same for emptying and cleaning. Also, these surfaces may not be always conveniently accessible. As an additional matter, when grasping the lid portion to effect removal, it is possible to bend, break or misalign the hingedly attached lid portion during removal. That is, the hinged attachment is usually not designed for withstanding any substantial amount of pulling or twisting force, but rather only for hingedly securing the lid for providing an openable closure for the ashtray.

OBJECTS AND SUMMARY OF THE INVENTION

Accordingly, it is a general object of this invention to provide a novel and improved pop-up ashtray which avoids the foregoing problems.

A related object is to provide a pop-up ashtray in accordance with the foregoing object which is relatively simple and inexpensive to fabricate and yet highly reliable in operation.

Briefly, and in accordance with the foregoing objects, a pop-up ashtray. for use in a motor vehicle or the like, comprises a generally rectilinear, frame-like receiver member configured and dimensioned to fit in a recess provided therefor in a motor vehicle or the like; a generally rectilinear ash-pot member defining an open-topped container and configured and dimensioned for removable mounting recessed within said rectilinear frame-like receiver member; a lid member dimensioned and configured for overlying said open-topped container defined by said ash-pot member to provide a closure therefor; cooperative interfitting hinge means formed on said receiver member and on said lid member for hingedly mounting said lid member to said receiver member for movement between a first position for overlying and providing a closure for said ash-pot member and a second position for permitting access to said ash-pot member; resilient means for urging said ash-pot member in a direction for removal thereof from said receiver member, and releasable clasping means defined respectively on said ash-pot member and said receiver member for overcoming said urging of said resilient means and releasably holding said ash-pot member with said container defined thereby recessed within said rectilinear framelike receiver member.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

DETAILED DESCRIPTION OF THE ILLUSTRATED EMBODIMENT

Figure 1:
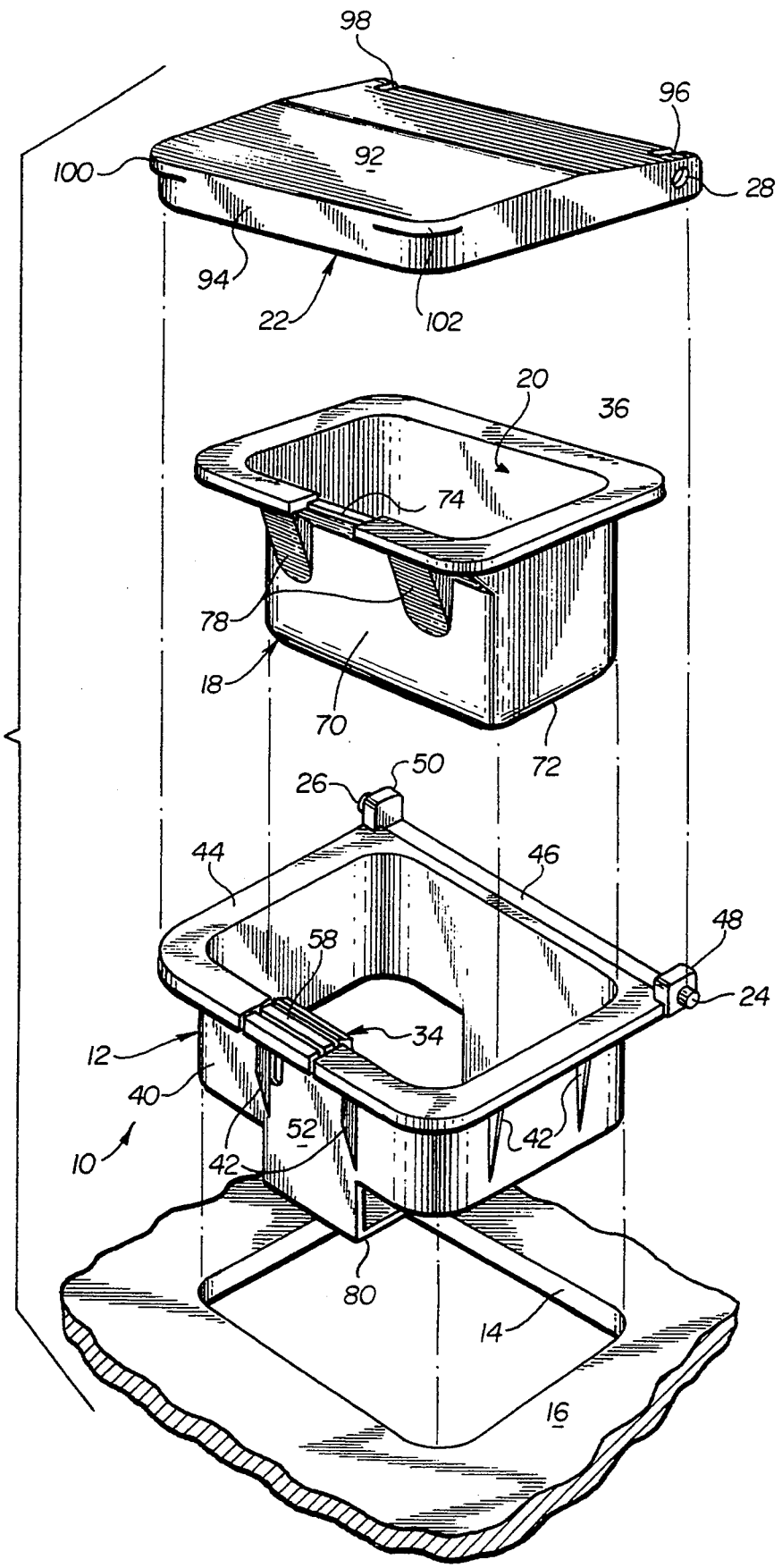
FIG. 1 is an exploded perspective view of a pop-up ashtray in accordance with the invention in connection with an apertured panel to which it is to be mounted.

Referring now to the drawings, and initially to FIG. 1, a pop-up ashtray in accordance with the invention is shown in an exploded perspective view, and is designated generally by the reference numeral 10. The ashtray 10 in accordance with the invention is comprised of three major components. A first component comprises a generally rectilinear frame-like receiver member 12 which is configured and dimensioned to fit within a recess or through opening 14 which is provided to receive the ashtray in a horizontal panel or wall portion 16 of a motor vehicle or the like. A generally rectilinear ash-pot member 18 defines an open-topped container 20 and is configured and dimensioned for removable mounting recessed within the rectilinear frame-like receiver member 12. The third of the major components of the pop-up ashtray of the invention comprises a lid member 22. The lid member 22 is dimensioned and configured for overlying the open-topped container 20 defined by the ash-pot member 18 to provide a closure therefor.

Figure 4:
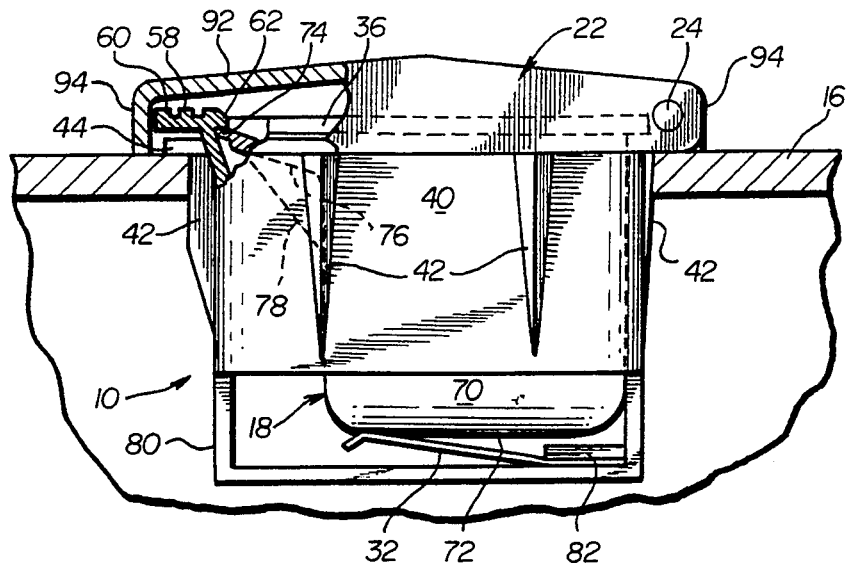
FIG. 4 is a side elevation of the ashtray of FIGS. 2 and 3.
Figure 5:
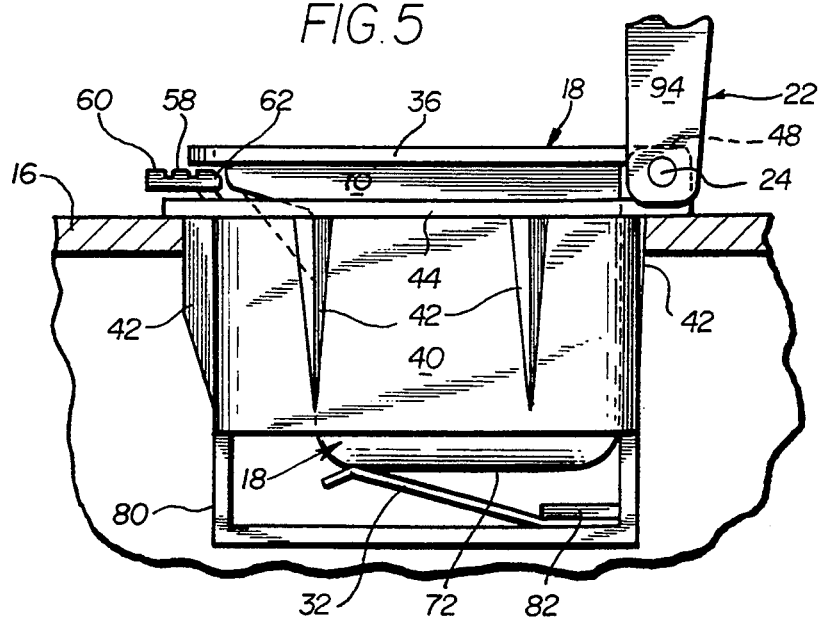
FIG. 5 is a side elevation similar to FIG. 4, illustrating the operation of the pop-up feature of the invention.

Cooperative interfitting hinge portions are formed respectively on the receiver member 12 and on the lid member 22 for hingedly mounting the lid member 22 to the receiver member 12. The lid member 22 is mounted in this regard for movement between a first position as illustrated in FIG. 4 for overlying and providing a closure for the ash-pot member 18 and a second position as illustrated in FIG. 5 for permitting access to the ash-pot member and removal thereof from the receiver member for emptying, cleaning and the like. In the illustrated embodiment, the hinge means comprise a pair of hinge pins 24, 26 formed on the receiver member 12 and complementary formed and located openings or recesses 28, 30 on the lid member 22 for receiving the hinge pins 24, 26. It will be appreciated that the arrangement of hinge pins and receiving recesses or apertures may be reversed, or that other equivalent hinge structures may be provided without departing from the invention.

In accordance with a further feature of the invention, resilient means are provided for urging the ash-pot member 18 in a direction for removal thereof from the receiver member 12. In the illustrated embodiment, the resilient means takes the form of a cantilevered spring member 32 which is mounted to the receiver member in a position such that its free end bears against a lower surface of the ash-pot member 18, to urge the same upwardly in a direction for removal thereof from the receiver member 12.

Cooperatively, the illustrated embodiment further provides a clasping means or arrangement including a clasp member 34 on the receiver member 12 which normally overlies a portion of a peripheral rim 36 of the ash-pot 18. The clasp member 34 is resiliently moveable as will be more fully described hereinbelow, such that this clasping structure is arranged for releasably holding the ash-pot member with its container 20 recessed within the rectilinear frame-like receiver member 12, thereby overcoming the urging of the resilient means or spring member 32.

Having described the basic structure of the pop-up ashtray of the invention, reference is invited to the remaining figures of drawings, wherein further details of the elements of the pop-up ashtray thus far described are illustrated and will be further described hereinbelow.

Referring to the frame-like receiver member 12, it will be seen that in the illustrated embodiment this member includes an outer, generally rectilinear, tubular peripheral wall portion 40 which is provided with a number of laterally outwardly projecting generally wedge-shaped retaining members or ribs 42. These ribs 42 are designed to wedge the receiver member within the through opening or receptacle 14 in a generally non-removable press-type fit. A peripheral rim member 44 extends generally perpendicularly laterally outwardly of an upper edge of the peripheral wall member 40. The hinge pins 24, 26 will be seen to be formed on an elongate rear extension portion, in the direction viewed in FIG. 1, which is generally T-shaped (see Fig. 2) and extends outwardly from a rear edge of the peripheral rim portion 44. This T-shaped extension 46 terminates in a pair of perpendicularly upwardly extending support members or surfaces 48, 50 and the respective hinge pins 24 and 26 project laterally and oppositely outwardly from these support members 48 and 50.

The clasp member 34 includes a generally vertically oriented portion 52 which is defined by a pair of generally vertically extending parallel cutouts 54, 56 which are formed in a front side, as it is viewed in FIG. 1, of the peripheral wall portion 40. The vertical wall portion 52 of the clasp 34 extends vertically upwardly to a point somewhat above the peripheral rim member 44. At this point, a laterally outwardly extending clasp portion 58 is formed generally perpendicular to the vertical portion 52. In the illustrated embodiment, a grasping surface 60 of the clasp member 58 extends forwardly somewhat beyond the forwardmost edge of the peripheral edge 44. An oppositely extending clasping portion 62 thereof is generally wedge-shaped, having a downwardly angled lead-in surface 64 for permitting a snapping engagement of a cooperating portion 74 of the ash-pot rim 36 thereunder. As the ash-pot is pushed downwardly relative to the receiver 12, the clasping portion 62 will resiliently return and snap back over and in engagement with the rim portion 74 of the ash-pot to retain the same fully recessed within the receiver 12, as illustrated in FIG. 4. The gripping surface 60 may be knurled as indicated in FIGS. 1, 2 and 4 to facilitate to grasping thereof for manually releasing the cooperating peripheral rim portion 74 of the ash-pot.

Figure 6:
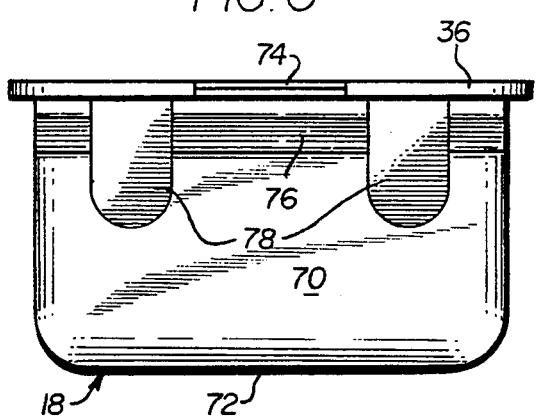
FIG. 6 is a front elevation of an ash-pot portion of the ashtray of the invention.
Figure 7:
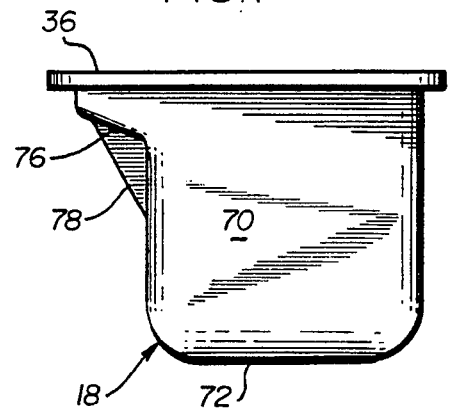
FIG. 7 is a side elevation of the ash-pot of FIG. 6.

Referring now also to FIGS. 6 and 7, further details of the ash-pot 18 are illustrated. Generally speaking, the ash-pot 18 comprises a generally rectilinear peripheral wall portion 70 which merges smoothly with a bottom wall portion 72 to define the container. The peripheral rim portion 36 is formed extending perpendicularly from an upper peripheral edge of the peripheral wall portion 70. This peripheral rim portion 36 is sized and located for at least partially overlying the peripheral rim portion 44 of the ash-pot member 12. A front, central portion of peripheral rim 36 is recessed somewhat, defining the above-mentioned a portion 74 for cooperating with the clasp member 34 to generally define the clasping means for releasably retaining the ash-pot member 18 in a recessed condition within the receiver member 12 as illustrated in FIGS. 2–4. In the illustrated embodiment, the ash-pot member further includes a serrated stub-out surface 76 inside of the peripheral rim member 36, which is flanked by a pair of angularly downwardly formed arcuate cigarette-holder surfaces 78.

A lower portion of the receiver member 12 is provided with a generally U-shaped strap member or portion 80 which extends laterally across and joins lower edges of respective front and rear portions of the peripheral wall 40 in the direction viewed in FIG. 1. This strap member 80 is provided with a pair of brackets 82, 84 for mounting the spring 32 in a cantilevered position for with its free end extending generally in an upward direction for engagement with the bottom wall portion 72 of the ash-pot member 18. The brackets 82, 84 may be formed by forming U-shaped cutouts in the strap 80 and pressing the cutouts generally upwardly to form a pair of generally L-shaped inwardly facing raised members which may receive an end portion of the spring 32 wedged thereunder.

Figure 2:
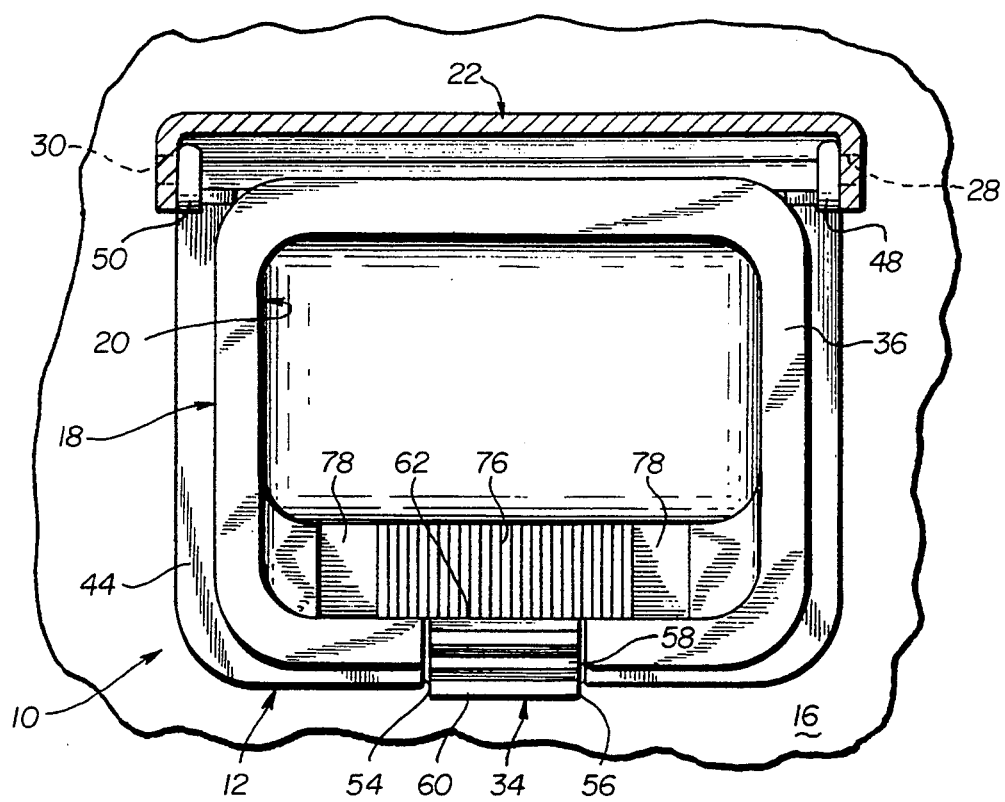
FIG. 2 is a top plan view of the ashtray of FIG. 1 mounted to the apertured panel.
Figure 3:
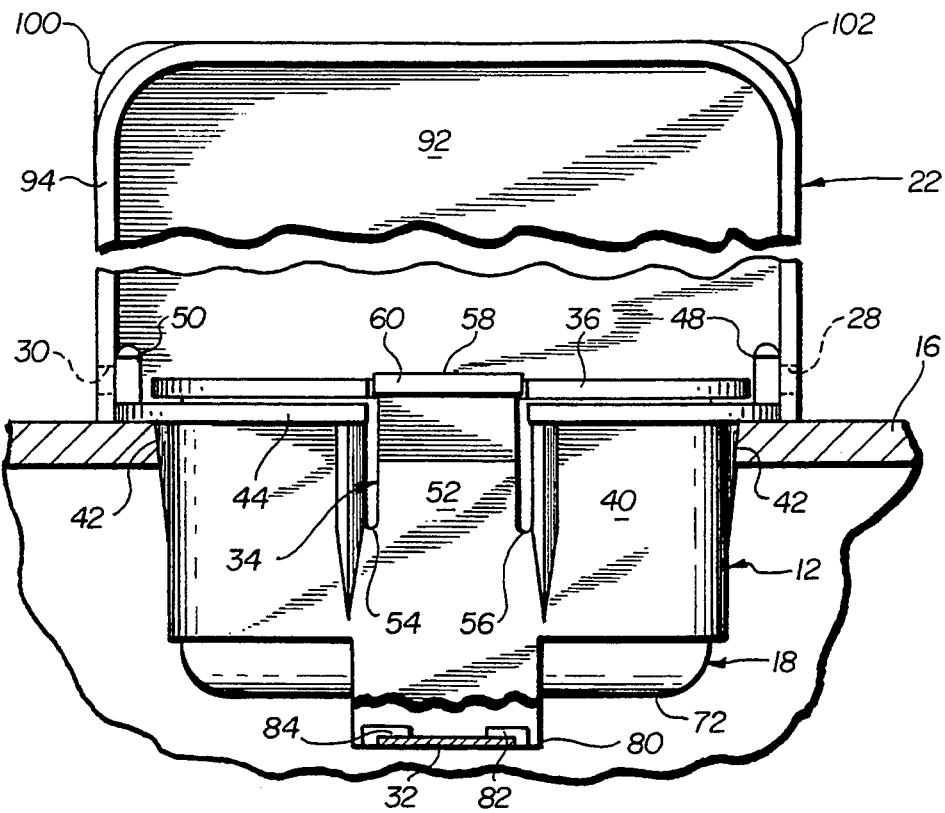
FIG. 3 is a front elevation of the ashtray of FIG. 2.

In this regard, the dimensions of the strap portion 80 are such that its bottom surface 86 is spaced from the peripheral rim 44 by a dimension somewhat greater than the depth of the ash-pot 18, such that insertion of the ash-pot 18 to its fully bottomed or recessed position as illustrated in FIGS. 2–4 will result in a flexing or tensioning of the cantilevered spring 32. This pre-tensioning of the cantilevered spring 32 is such that the spring 32 will tend to resiliently return to the condition illustrated in FIG. 5 upon release of the clasp 34, to thereby eject or push up a substantial portion of the ash-pot 18 for convenient grasping and removal thereof.

Referring now in additional detail to the lid member 22, it comprises a generally rectilinear wall member 92, which has a peripheral downwardly perpendicularly depending skirt member or portion 94. The wall 92 and the skirt 94 are dimensioned and configured for overlying the peripheral rim portion 44 of the receiver member 12 and the clasp 34, as shown for example in FIG. 4. The peripheral skirt 94 and wall 92 are slotted as indicated at reference numerals 96 and 98 adjacent the respective through openings 28, 30 which receive the hinge pins 24, 26. This arrangement defines some resiliency or flexibility to the portions of the peripheral skirt 94 on which the apertures 28 and 30 are formed to allow for snapping engagement thereof with the hinge pins 24 and 26.

In operation, as best viewed in FIGS. 4 an 5, the ash-pot 18 is initially fully recessed within the receiver 12 as shown in FIG. 4. The lid 22 may be moved alternately between its open and closed position for using the ashtray, or for providing a closure. When it is desired to remove the ash-pot for emptying and/or cleaning, the lid 22 is opened as indicated in FIG. 5. In this regard, in the illustrated embodiment, the wall member or portion 92 of the lid extends at opposite corners somewhat beyond the peripheral skirt as indicated at reference numerals 100, 102 to facilitate grasping of the lid for opening and closing. Thereupon, and referring to FIG. 5, the clasp 34 is released by grasping the same and pulling outwardly of the peripheral wall 40 of the receiver 12. This releases the peripheral rim portion 74 of the ash-pot 18, which in turn permits the ash-pot 18 to be pushed upwardly under the influence of the spring 32, as shown in FIG. 5. The peripheral rim portion 36 of the ash-pot is then readily manually accessible for completing removal of the same from the receiver 12.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A pop-up ashtray comprising: a receiver member including an outer peripheral wall portion comprising a generally rectilinear tubular structure and an upper peripheral rim portion extending perpendicularly laterally outwardly of an upper edge of said peripheral wall portion; a generall rectilinear ash-pot member comprising an open-topped container and configured and dimensioned for removable mounting within said rectilinear receiver member; a lid member dimensioned and configured for overlying said open-topped container to provide a closure therefor; cooperative interfitting hinge means formed on said receiver member and on said lid member for hingedly mounting said lid member to said receiver member for movement between a first position for overlying and providing a closure for said ash-pot member and a second position for permitting access to said ash-pot member; resilient means for urging said ash-pot member in a direction for removal thereof from said receiver member, and releasable clasping means formed respectively on said ash-pot member and said receiver member for overcoming said urging of said resilient means and releasably holding said ash-pot member within said rectilinear receiver member, said releasable clasping means including a resiliently movable clasp member extending from said peripheral wall portion and spaced upwardly of said peripheral rim portion.

2. A pop-up ashtray according to claim 1 wherein said hinge means includes a pair of hinge pins adjacent opposite lateral edges of said rim portion extending generally parallel to one side of said peripheral wall portion.

3. A pop-up ashtray according to claim 1 wherein said clasp member is formed by a pair of parallel cutouts along one side of said peripheral wall portion, a segment of said peripheral wall portion between said cutouts extending upwardly past said peripheral rim portion and terminating in a laterally outwardly extending clasping portion.

4. A pop-up ashtray according to claim 1 wherein said ash-pot comprises a generally rectilinear peripheral wall portion, a bottom wall portion joined with said peripheral wall portion to form said container and a generally outwardly extending upper peripheral rim portion extending perpendicularly from an upper peripheral edge of said peripheral wall portion; said peripheral rim portion being sized and located for overlying the peripheral rim portion of said receiver member; and the clasping means formed on said receiver member being located and configured for overlying a portion of the peripheral rim of said ash-pot member, said portion of said peripheral rim of said ashpot member also comprising a portion of said releasable clasping means.

5. Apparatus according to claim 4 wherein said resilient means comprises a spring member mounted in a lower portion of said receiver member for engaging and urging upwardly the bottom wall portion of said ash-pot member.

6. A pop-up ashtray according to claim 2 wherein said lid member comprises a generally rectilinear wall member having a downwardly perpendicularly depending peripheral skirt member, dimensioned and configured for surroundingly overlying said peripheral rim portion of said receiver member, and a pair of hinge pin-receiving openings formed in said depending skirt portion and located for interfitting with said hinge pin members of said receiver to form a hinged attachment of said lid member to said receiver member.

7. A pop-up ashtray according to claim 1 wherein said resilient means comprises an elongate spring member and wherein said receiver member further includes a strap portion extending between bottom edges of opposing surfaces of said peripheral wall portion and spaced from said peripheral rim portion by a dimension somewhat greater than a depth of said ash-pot member and bracket means formed on said bottom wall portion for mounting said spring member thereto in a cantilevered condition with a free end of said elongate spring member extending in a position for exerting an upward force against said ash-pot member.

* * * * *